No. 12,553. REISSUED NOV. 6, 1906.
J. S. PATES.
COAL TIPPLE.
APPLICATION FILED SEPT. 8, 1906.
3 SHEETS—SHEET 1.
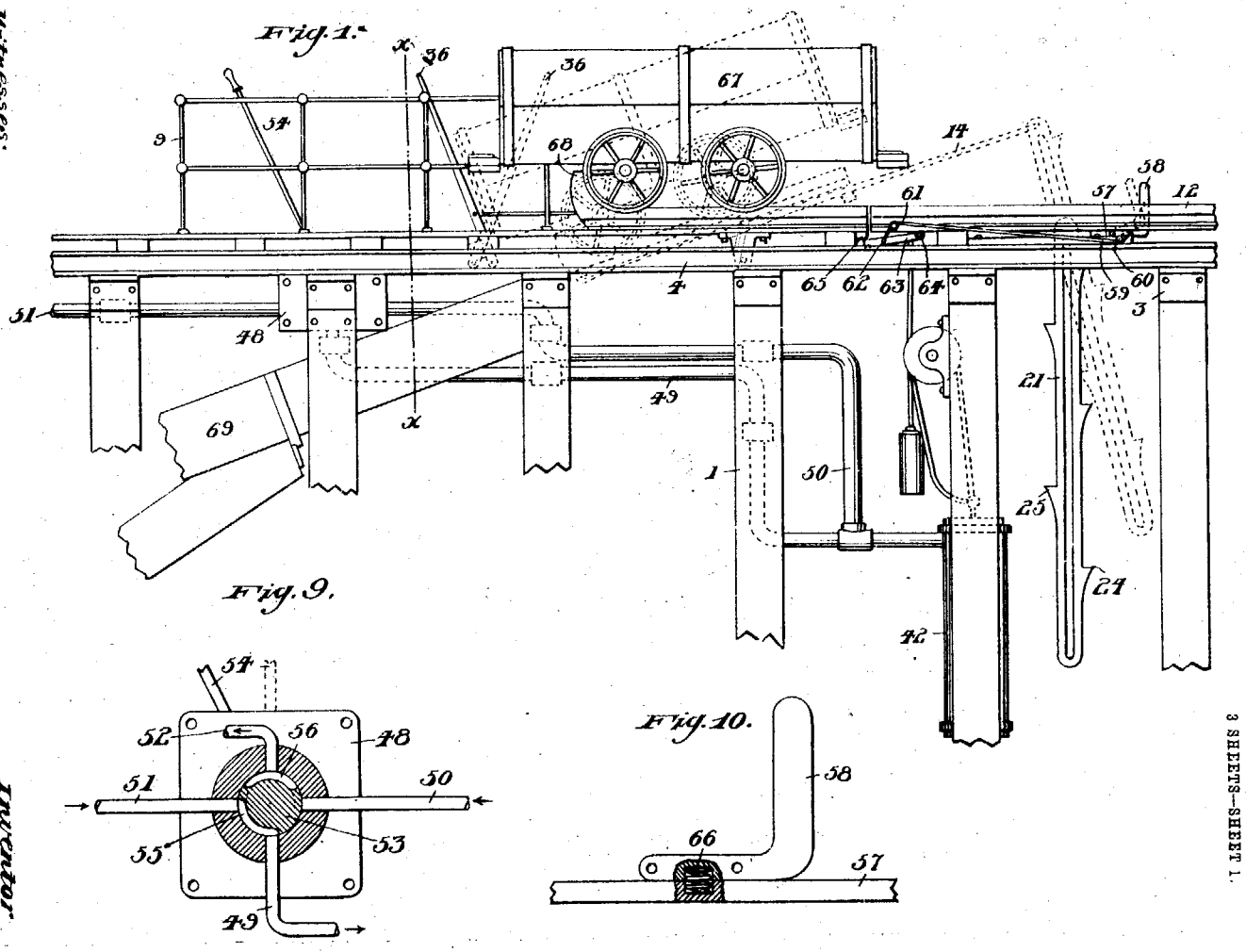
Witnesses:
J. P. Appleman
P. C. Chambers
Inventor
James S. Pates
By Geo. Hoskit
Atty.

No. 12,553. REISSUED NOV. 6, 1906.
J. S. PATES.
COAL TIPPLE.
APPLICATION FILED SEPT. 8, 1906.
3 SHEETS—SHEET 2.
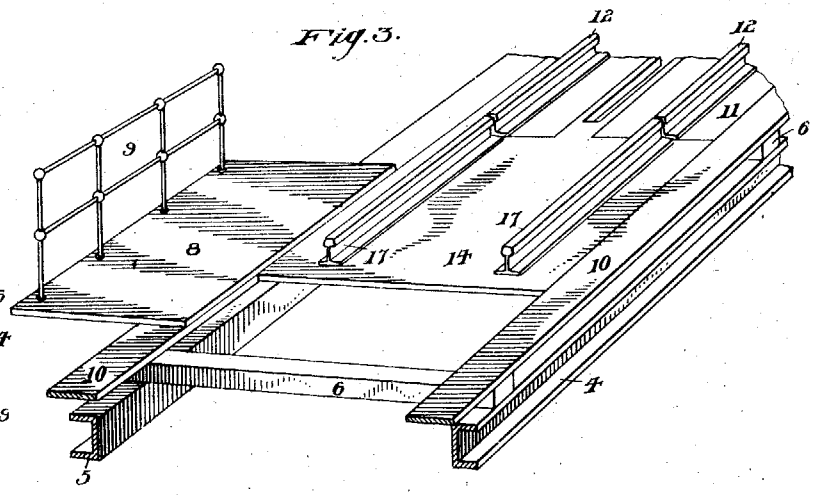
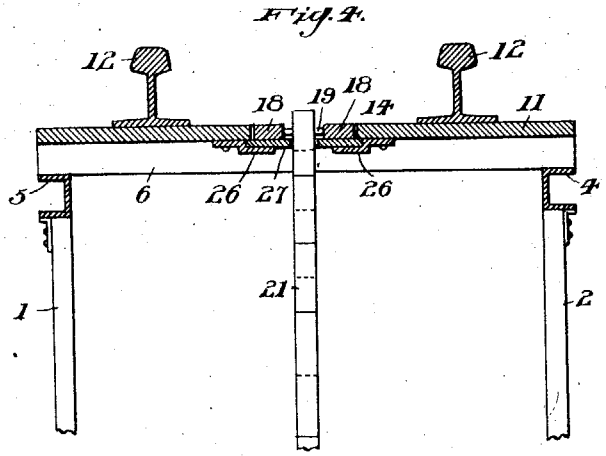
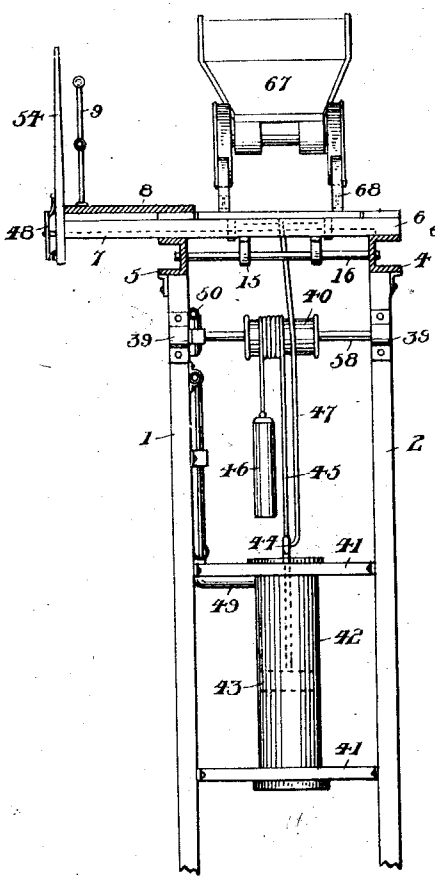
Witnesses:
J. P. Appleman.
P. S. Chambers.
Inventor
James S. Pates,
By Jno. Vorbit
Atty.

No. 12,553. REISSUED NOV. 6, 1906.
J. S. PATES.
COAL TIPPLE.
APPLICATION FILED SEPT. 8, 1906.
3 SHEETS—SHEET 3.
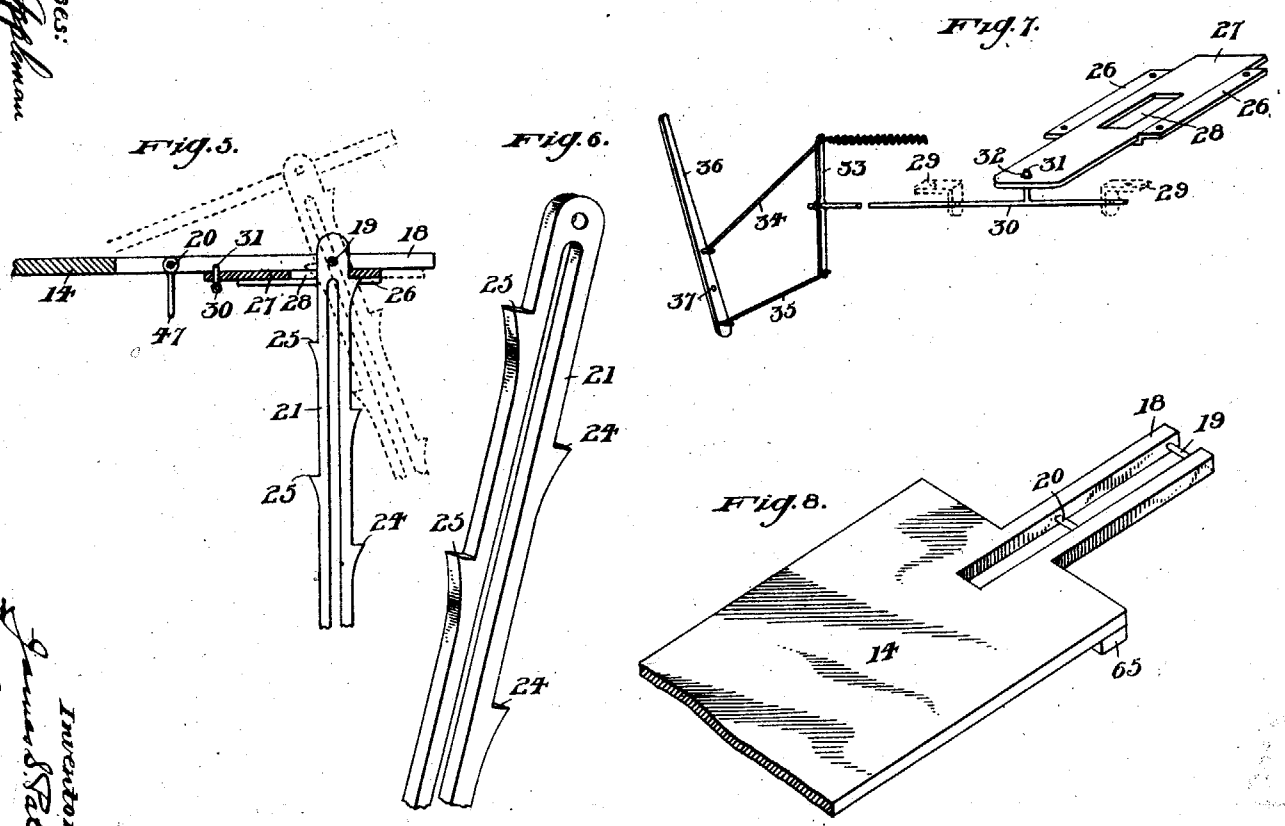
Witnesses:
J. R. Appleman
F. Chambers,
Inventor
James S. Pates,
By Jno. Hobit
Atty

UNITED STATES PATENT OFFICE.

JAMES S. PATES, OF MONONGAHELA, PENNSYLVANIA, ASSIGNOR, BY DIRECT AND MESNE ASSIGNMENTS, TO WILLIAM W. KEEFER; SAID JAMES S. PATES AND SAMUEL A. SCOTT COMPOSING THE COPARTNERSHIP OF COAL HANDLING MACHINERY COMPANY, OF PITTSBURG, PENNSYLVANIA.

COAL-TIPPLE.

No. 12,553. Specification of Reissued Letters Patent. Reissued Nov. 6, 1906.

Original No. 827,560, dated July 31, 1906. Application for reissue filed September 8, 1906. Serial No. 333,854.

*To all whom it may concern:*

Be it known that I, JAMES S. PATES, a citizen of the United States of America, residing at Monongahela, in the county of Washington and State of Pennsylvania, have invented certain new and useful Improvements in Coal-Tipples, of which the following is a specification, reference being had therein to the accompanying drawings.

This invention relates to certain new and useful improvements in coal-tipples, and more particularly to an overhead tipple constructed above a railroad or river for discharging coal or like fuel from mining-cars or river-craft.

The primary object is the provision of positive and reliable means for effecting the discharge of coal from a mining-car in a manner to prevent too large a body of coal going on the screen at one time, and thereby preventing the coal from being properly screened.

My invention aims to provide a novel form of tilting platform upon which cars are moved and tilted to discharge their contents.

In connection with a tilting platform I have devised novel means for creating a spasmodic or jerky movement of the platform when being tilted, whereby the entire contents of a car will be discharged. In connection with the tilting platform I have also devised positive means for easily and quickly returning the tilting platform, together with the car upon the same, to its normal position, the operation of tilting the platform and returning it to its normal position being controlled and managed by an attendant of a tipple. I have also provided a novel form of safety-stop or buffer adapted to be actuated in conjunction with the tilting platform to prevent cars from passing onto the platform or striking the same when the platform is being tilted.

With the above and other objects in view, which will more readily appear as the nature of the invention is better understood, the same consists in the novel construction, combination, and arrangement of parts to be hereinafter more fully described and claimed, and, referring to the drawings accompanying this application, like numerals of reference designate corresponding parts throughout the several views, in which—

Figure 1 is a fragmentary side elevation of a coal-tipple constructed in accordance with my invention, illustrating a car upon the tilting platform thereof and showing said car, together with the platform and a part of its mechanism, in adjusted position in dotted lines. Fig. 2 is a vertical sectional view of the coal-tipple, taken on line *x x* of Fig. 1. Fig. 3 is a perspective view of a portion of the coal-tipple, illustrating the tilting platform and the framework thereof. Fig. 4 is a vertical transverse sectional view taken through the right-hand end of Fig. 1 substantially at the point where the jarring-bar is hung. Fig. 5 is a fragmentary longitudinal sectional view of the tilting platform, showing the reciprocating slide or stop and a part of the jarring-bar. Fig. 6 is a fragmentary perspective view of the jarring-bar. Fig. 7 is a perspective view of the reciprocating stop-forming slide and its actuating mechanism. Fig. 8 is a perspective view of the rear end of the tilting platform. Fig. 9 is a detail sectional view of a triple or three-way valve used with my device. Fig. 10 is a detail view of the safety-stop or buffer used in connection with the coal-tipple.

In the accompanying drawings I have illustrated a conventional form of framework such as is generally used in connection with coal-tipples, the framework embodying a plurality of standards 1 1 and 2 2, said standards being arranged in two rows in parallel alinement with one another. The upper end of the standards are provided with brackets 3 and support channel-bars 4 and 5. The channel-bars are arranged longitudinally upon the upper ends of the standards 1 and 2 and support transverse braces 6, some of which are extended, as at 7, to support a platform 8, having a guard-railing 9 upon its outer side. Upon the ends of the transverse braces 6 are supported longitudinally-disposed slats or plates 10 10, while adjacent to the platform 8 is arranged a platform 11, and upon the top of this platform and the transverse braces 6 is constructed a track 12.

My invention relates to mounting a tilting platform 14 adjacent to the platform 11 and between the transverse braces 6. The tilting platform is provided with depending brackets 15 15, which receive and work on a rod 16, mounted between the channel-bars 4 and 5. Upon the tilting platform 14 are mounted rails or a section of track 17, adapted to aline with the rails of the track 12. The tilting platform 14 is provided with an outwardly-extending bifurcated tongue or arm 18, carrying transverse pins 19 and 20. Upon the pin 19 of the tongue 18 of the tilting platform 14 is mounted a depending tripping and locking bar 21, having teeth 24 and 25 on opposite edges staggered relatively to each other.

The platform 11 is cut away to accommodate the tongue 18 of the tilting platform 14, and the platform 11 upon each side of the depending bar 21 is provided with brackets or guide-plates 26 26, and in said brackets or guide-plates is mounted a reciprocating slide 27, said slide having an oblong opening or slot 28, through which the depending bar 21 extends. The forward end of the platform 11 is provided with depending brackets 29 29, and mounted in said brackets is a rock-shaft 30, carrying an upwardly-extending arm 31, which extends into an opening 32, formed in the end of the reciprocating slide 27. The one end of the rock-shaft 30 extends outwardly to one side of the tipple and is provided with a rocking arm 33, the ends of said arms being connected by cables 34 and 35 to an operating-lever 36, said lever being fulcrumed, as at 37, upon the end of one of the transverse braces 6 and protruding upwardly alongside of the guard-railing 9, whereby the attendant of the tipple can easily manipulate the operating-lever 36 to reciprocate the slide 27.

Beneath the arms 18 of the tilting platform is journaled a shaft 58, said shaft being journaled in brackets 39 39, carried by the standards 1 and 2 of the coal-tipple. Upon the shaft 38 is mounted a flanged pulley 40, the object of which will presently appear.

Between the standards 1 and 2, beneath the flanged pulley 40, are arranged transverse braces 41 41, supporting a vertically-disposed cylinder 42. In the cylinder 42 is mounted a conventional form of piston-head 43, the rod 44 of which extends out of the upper end of the cylinder 42. Connected to the upper end of the rod 44 is a cable 45, said cable passing upwardly around the flanged pulley 40 and has its loose end provided with a weight 46, whereby the piston-head 43 will be normally held in the upper end of the cylinder, except when the same is being operated as will be presently described. Attached also to the upper end of the piston-rod 44 is a chain or cable 47, which has its upper end attached to the pin 20 of the arm 18 of the tilting platform.

Attached to the ends of the transverse braces 6, which support the platform 8, is a conventional form of triple or three-way valve 48, having a pipe 49 leading to the upper end of the cylinder 42. Another pipe 50 connects with the pipe 49 adjacent to the cylinder, also with the valve 48. The valve is supplied with air by a pipe 51 from a suitable compressor or air-pump, (not shown,) and the valve is also provided with an exhaust-pipe 52. The valve-plug 53 of the valve 48 is rotated by a lever 54, which extends up along the guard-railing 9, where it can be conveniently operated by the attendant of the coal-tipple. The periphery of the valve-plug 53 is provided with two ports 55 and 56, these ports being adapted to establish communication between the pipes 51 and 49 and the pipes 50 and 52, respectively.

In connection with the mechanism just described I use a safety-stop or buffer which is automatically actuated by the tilting of the platform 14. Upon a plate 57, mounted beneath the platform 11 between the channel-bars 4 and 5, is pivoted an angular arm 58, which I have termed a "safety-stop" or "buffer." The arm is adapted to lie in engagement with the plate 57 and is held in this position by a cable 59, which passes over a pulley 60, carried by the edge of plate 57, said cable also passing over a pulley 61, carried by the edge of platform 11, and is attached, as at 62, to an arm 63, which is pivoted, as at 64, to the bottom of the platform 11. The end of the tilting platform adjacent to the arm 18 is provided with a block 65 upon its one side adapted to engage the loose end of the arm 63 when the tilting platform is in its normal position. The loose end of the arm 63 will be held in a lowered position; but when the tilting platform is moved the arm will be released and a spring 66, mounted beneath the safety-stop or buffer 58, will elevate the safety-stop or buffer, also the outer end of arm 63.

In order that the operation of my improved coal-tipple may be readily understood, I have illustrated a car 67 upon the tilting platform 14, said car being retained thereon for tilting by a conventional form of wheel-grips 68, which are adapted to support the car when the tilting platform is operated, one of the positions assumed by the tilting platform during the operation being shown in dotted lines in Fig. 1. Assuming that the car 67 is full of coal or the like and it is desired to dump the same into the chute and screen 69, generally used in connection with coal-tipples, the attendant of the tipple standing upon the platform 8 operates the lever 36. The forward movement of the operating-lever 36 to the position shown in dotted lines moves the slide 27 in one direction through the medium of the rock-shaft 30. As the slide engages the uppermost tooth 24 on one side of the bar 21 the latter will be released, and as the greater part of the car 67 is past the pivot-point or fulcrum of the tilting platform 14 the weight of the car will cause the platform to tilt; but its movement will be limited by the opposite edge of the opening 28 of the slide 27 engaging the uppermost tooth 25 on the opposite edge of bar 21. It will of course be understood that the end gate of the car 67 has been opened to permit of the contents thereof descending into the chute and screen 69, and the sudden stoppage of the car 67 by the uppermost tooth 25 of the bar 21 is adapted to jar the contents of the car and cause a portion of the same to be precipitated into the chute or screen 69. A further tilting of the platform 14 is accomplished by throwing the lever 36 to its normal position, which moves the slide 27 out of engagement with the uppermost tooth 25 of the bar 21 and permits the tilting platform to further tilt until the next succeeding tooth 24 is engaged by the slide 27. The reciprocating of the slide 27 is continued until the lowermost tooth 24 has been engaged by said slide, the engagement of the tooth 24 placing the tilting platform at such an inclination as to discharge its entire contents into the chute and screen 69.

The reciprocating slide 27, together with the bar 21, forms a particular feature of my invention in so much as considerable trouble has been experienced in properly emptying the contents of the cars run upon a coal-tipple. Heretofore the cars have been suddenly tilted to discharge their coal or contents upon the screens, and by the sudden discharge of the coal it is impossible for the various grades of coal to pass through their respective screens. For instance, the fine coal is supposed to pass through the first screen; but when the entire load is precipitated upon the screen the fine coal is carried along with the large coal and prevented from passing through the right screen into its proper chute or car. By the spasmodic or intermittent movement imparted to the tilting platform 14 and the car 67 by the bar 21 being released by the slide 27 I am enabled to discharge the contents of a car slowly and at such periods of time as will permit of the quantities of coal discharged from the car being thoroughly screened. The jerky step-by-step stop-and-start movement imparted to the tilting platform carrying the car is adapted to sufficiently jar the contents thereof to cause every particle contained within the car to be discharged, this movement of the tilting platform and the car being accomplished without detriment to the structure of the coal-tipple.

Simultaneous with the first operation or tilting of the platform 14 and the car 67 the arm 63 is released by the platform, which permits of the saftey-stop or buffer 58 extending upwardly through the platform 11, and this safety-stop or buffer is adapted to prevent another car from striking the car 67 or the tilting platform, thus preventing accidents which otherwise might occur were not the safety-stop or buffer used. The return of the tilting platform after the car 67 has been emptied is adapted to again depress the arm 63 and return the safety-stop or buffer to its normal position, whereby the car 67 can be removed from the tilting platform and another coal-car placed thereon. In order to return the tilting platform to its normal position after the contents of the car 67 have been discharged, I have provided the three-way valve 48, the cylinder 42, the flanged pulley 40, and their appurtenant parts. The attendant of the coal-tipple operates the lever 54 to move the plug 53 of the valve 48, whereby a supply of compressed air will be conveyed to the top of the cylinder through the pipes 51, port 55, and pipe 49.

In the accompanying drawings, the position of the valve 48, the piston-head 43, the chain 47, and the cable 45 are shown as if the cylinder 42 had just been charged with compressed air to return the tilting platform 14 to its normal position. When the air passes into the cylinder 42, the piston-head 43 is forced downwardly, and as the chain 47 is attached to the upper end of the piston-rod 44 the tilting platform 14 will be returned to its normal position and retained there by the uppermost tooth 24 of the bar 21. The beveled edges of teeth 24 and 25 permit of the bar 21 receding to its normal position, this movement of the bar of course reciprocating the slide 27 and oscillating the lever 36. When the lever 54 is moved to the position shown in dotted lines of Fig. 2, the supply of air to the cylinder will be shut off and the port 56 moved to establish communication between the exhaust-pipe 52 and the pipe 50. The air within the cylinder 42 will then exhaust through a portion of the pipe 49, the pipe 50, port 56, and exhaust-pipe 52, and the piston-head 43, together with the piston-rod 44, will be returned to their normal position by the weight 46, mounted upon the end of the cable 45. The valve is then permitted to remain in the exhaust position until another car has been run upon the tilting platform 14 and its contents discharged in the manner just described in connection with the car 67.

I do not care to confine myself to the detail construction of my invention or to the size or proportions of the same, and such changes as are permissible by the appended claims may be resorted to without departing from the spirit and scope of the invention.

What I claim, and desire to secure by Letters Patent, is—

1. In a coal-tipple, the combination with standards, a stationary platform supported by said standards, a track supported by said standards, a platform supported by one side of said standards, of a tilting platform mounted at the end of said stationary platform and having wheel-grips to support a car, a reciprocating slide mounted beneath said stationary platform, a depending bar carried by the end of said tilting platform and extending through said slide, staggeredly-arranged teeth carried by said bar and engaged by said slide, a cylinder supported by said standards and having a piston operating therein, a chain connecting said piston and the end of said tilting platform, means to reciprocate said slide, means to normally maintain the piston within said cylinder in an elevated position, means to lower said piston, and means carried by said platform to control the last-named means, substantially as described.

2. In a coal-tipple, the combination with standards, a track supported by said standards, a platform supported by said standards, of a tilting platform supported by said standards, a reciprocating slide mounted adjacent to said track, a depending bar carried by one end of said tilting platform and extending through said slide, staggeredly-arranged teeth carried by said bar and adapted to be engaged by said slide, a spring-actuated safety-stop mounted in said track and held in a fixed position by said tilting platform and released by the tilting of said platform, means to reciprocate said slide, and means to return said platform to its normal position, when tilted, substantially as described.

3. In a coal-tipple, the combination with standards, of a track and platform supported by said standards, a tilting platform mounted between said standards, a cylinder mounted between said standards and having a piston operating therein, a chain connecting the one end of said platform and said piston, a spring-held safety-stop mounted adjacent to said track, means to impart a spasmodic tilting movement to said platform, means actuated by the movement of said platform to release said safety-stop, means to normally hold said piston in an elevated position, means to lower said piston to return said tilting platform to its normal position, and means mounted adjacent to said platform to control the last-named means, substantially as described.

4. In a coal-tipple, the combination with standards, of a tilting platform between said standards, a spring-held safety-stop mounted adjacent to said platform, means to impart a spasmodic tilting movement to said platform, means actuated by the first movement of said platform to release said stop, and means to simultaneously return said platform and said stop to their normal position, substantially as described.

5. In a coal-tipple, the combination with standards, of a tilting platform mounted between said standards, a movable safety-stop mounted adjacent to said platform, means to impart a spasmodic tilting movement to said platform, means actuated by the movement of said platform to move said safety-stop, means to return said tilting platform to its normal position, and means to control the last-named means, substantially as described.

6. In a coal-tipple, the combination with a tilting platform adapted to support a car, of a depending toothed bar carried by the one end of said platform, a reciprocating slide adapted to engage first one tooth and then another tooth of said bar to impart a jerky movement to said tilting platform, and means to reciprocate said slide, substantially as described.

7. In a coal-tipple, the combination of a tilting platform, of means to impart a spasmodic and jerky tilting movement to said platform, and means to return said platform to its normal position, substantially as described.

8. In a coal-tipple, the combination of a tilting platform, a depending toothed bar carried by said platform, and means engaging said bar to limit the movement of said platform, substantially as described.

9. In a coal-tipple, the combination of a tilting platform, a toothed bar carried by said platform, and means to impart an intermittent movement to said platform through the movement of said bar, substantially as described.

10. The combination with a tilting platform, of means to impart an intermittent movement to said platform, said means embodying a toothed bar and a reciprocating plate, substantially as described.

11. In a tipple, the combination of a car-tilting device, and holding and releasing mechanism adapted to alternately stop and release said device while tilting.

12. In a tipple, car-tilting mechanism having a series of holding-points, in combination with a shifting stop device always in engaging position with one or another of the holding-points.

13. In a tipple, the combination of a car-tilting device, and holding and releasing mechanism upon which said device exerts a pull when tilting, said mechanism having a plurality of holding-points and a shifting stop device adapted when disengaged from one of said points to be in engaging position with another point.

14. In a tipple, the combination of car-tilting mechanisms having two series of holding-points, and a shifting stop device adapted when shifted to release a holding-point of one series and engage a point of the other series.

15. In a tipple, the combination of a tilting car-support, a bar secured thereto having opposite faces provided each with a series of teeth, the teeth of the two series being staggered, and a reciprocating stop device having two teeth-engaging portions between which the bar moves when the car-support tilts, each reciprocation of the stop device releasing a tooth of one series and simultaneously positioning it for engaging a tooth of the other series.

16. The combination of a car-track having a movable section, a car-stop adjacent the movable section, and means actuated by the latter when in normal position for holding the stop out of car-stopping position.

17. The combination of a car-track having a movable section, a vertically-movable self-raising car-stop adjacent the movable section, and means actuated by the latter when in normal position for holding the stop depressed and out of car-engaging position.

18. The combination of a car-track having a tilting section, a vertically-movable self-raising car-stop adjacent the tilting section, a depressible device in the path of and adapted to be deflected by the movable section as the latter moves to horizontal position, and a connection between said device and the car-stop operating to hold the latter out of car-engaging position when said device is depressed.

19. The combination of a car-track having a tilting section, a vertically-moving self-raising car-stop adjacent the tilting section, a pivoted arm in the path of and adapted to be depressed by the tilting section when the latter is in horizontal position and a flexible connection between said arm and the stop for holding the stop out of car-engaging position when the arm is depressed.

20. In a tipple, the combination of a tilting car-support, a power-cylinder and piston, a flexible connection between the piston and support for returning the latter from tilted position, and means for returning the piston to starting position after it has thus moved the support.

21. In a tipple, the combination of a car-tilting support, a power-cylinder and piston, a flexible line connecting the support and piston for returning the support from tilted position, and a weighted line connected to the piston for returning it to starting position after the support has been thus moved.

22. In a tipple, the combination of a tilting car-support, a power-cylinder and piston, a flexible line connecting the support and piston, a weighted line also connected to the piston, a fluid-inlet for the cylinder, and a valve for alternately admitting and discharging fluid from the cylinder.

In testimony whereof I affix my signature in the presence of two witnesses.

JAMES S. PATES.

Witnesses:
J. M. NESBIT,
P. S. CHAMBERS.